US012463227B2

(12) United States Patent
Harr et al.

(10) Patent No.: US 12,463,227 B2
(45) Date of Patent: Nov. 4, 2025

(54) FUEL CELL SYSTEM

(71) Applicant: CELLCENTRIC GMBH & CO. KG, Kirchheim unter Teck (DE)

(72) Inventors: Oliver Harr, Reichenbach (DE); Philipp Hausmann, Kirchheim (DE); Benjamin Pieck, Kirchheim (DE)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 543 days.

(21) Appl. No.: 17/998,770

(22) PCT Filed: May 12, 2021

(86) PCT No.: PCT/EP2021/062573
§ 371 (c)(1),
(2) Date: Nov. 14, 2022

(87) PCT Pub. No.: WO2021/228915
PCT Pub. Date: Nov. 18, 2021

(65) Prior Publication Data
US 2023/0197988 A1   Jun. 22, 2023

(30) Foreign Application Priority Data
May 15, 2020   (DE) .................... 10 2020 206 156.4

(51) Int. Cl.
*H01M 8/04* (2016.01)
*H01M 8/04111* (2016.01)
(Continued)

(52) U.S. Cl.
CPC .... *H01M 8/04225* (2016.02); *H01M 8/04111* (2013.01); *H01M 8/04126* (2013.01); *H01M 8/04156* (2013.01); *H01M 8/04253* (2013.01)

(58) Field of Classification Search
CPC ......... H01M 8/04225; H01M 8/04111; H01M 8/04126; H01M 8/04156; H01M 8/04253
(Continued)

(56) References Cited

U.S. PATENT DOCUMENTS

2009/0104480 A1   4/2009   Machuca et al.
2015/0285191 A1   10/2015   Kitada
(Continued)

FOREIGN PATENT DOCUMENTS

DE         10130036        2/2002
DE       102007037096      2/2009
(Continued)

OTHER PUBLICATIONS

Official Action with English Translation for Japan Patent Application No. 2022-568368, dated Oct. 17, 2023, 8 pages.
(Continued)

*Primary Examiner* — James M Erwin
(74) *Attorney, Agent, or Firm* — Sheridan Ross P.C.

(57) ABSTRACT

The invention relates to a fuel cell system with at least one fuel cell stack, which comprises an anode chamber and a cathode chamber, with at least one air conveying device for the supply of the cathode chamber with air via a feed air line, with an outlet air line from the cathode chamber, with at least one fuel supply device for the supply of the anode chamber with fuel, with at least one anode circuit for the recirculation of unused fuel around the anode chamber, furthermore with a cathode bypass. The fuel cell system according to the invention is characterized in that the cathode bypass line branches off from the feed air line upstream of or in the region of a valve device in said feed air line, and opens into the outlet air line downstream of or in the region of a further valve device in said outlet air line, wherein a gas jet pump which can be driven by the air which
(Continued)

flows around the cathode chamber is arranged in the cathode bypass, which gas jet pump is connected switchably on the suction side to the anode chamber and/or the cathode chamber.

20 Claims, 1 Drawing Sheet

(51) Int. Cl.
  *H01M 8/04119* (2016.01)
  *H01M 8/04223* (2016.01)
  *H01M 8/04225* (2016.01)

(58) Field of Classification Search
  USPC ........................................................ 429/429
  See application file for complete search history.

(56) References Cited

U.S. PATENT DOCUMENTS

| 2017/0317364 | A1 | 11/2017 | Lucas et al. | |
|---|---|---|---|---|
| 2019/0109338 | A1* | 4/2019 | Yamamori | H01M 8/04201 |
| 2020/0036017 | A1* | 1/2020 | Matsuo | H01M 8/04253 |
| 2021/0104758 | A1* | 4/2021 | Tanimoto | H01M 8/04567 |

FOREIGN PATENT DOCUMENTS

| DE | 102008051964 | 5/2009 |
|---|---|---|
| DE | 102009043569 | 4/2011 |
| DE | 102014207450 | 10/2015 |
| DE | 102014221321 | 4/2016 |
| DE | 102017204110 | 9/2018 |
| DE | 102017220855 | 5/2019 |
| DE | 102018202906 | 8/2019 |

OTHER PUBLICATIONS

International Search Report and Written Opinion for International (PCT) Patent Application No. PCT/EP2021/062573, dated Nov. 19, 2021, 19 pages.

English Translation of the International Search Report for International (PCT) Patent Application No. PCT/EP2021/062573, dated Nov. 19, 2021, 5 pages.

* cited by examiner

FUEL CELL SYSTEM

CROSS REFERENCE TO RELATED APPLICATIONS

This application is a national stage application under 35 U.S.C. 371 and claims the benefit of PCT Application No. PCT/EP2021/062573 having an international filing date of 12 May 2021, which designated the United States, and which PCT application claimed the benefit of German Patent Application No. 10 2020 206 156.4 filed 15 May 2020, the contents of each of which are incorporated herein by reference in their entireties.

The invention relates to a fuel cell system according to the preamble of claim 1. It also relates to a method for operating such a fuel cell system.

Fuel cell systems with at least one fuel cell stack are known from the prior art. For example, they can be used to generate electrical drive power in vehicles. The fuel cells are typically so-called PEM fuel cells, i.e. low-temperature fuel cells with a membrane permeable to protons, particularly for this purpose. This type of fuel cell is now relatively common. However, it has two serious problems with regard to its service life in regular operation. On the one hand, there is the constant need to keep the membranes sufficiently moist during operation, since drying out of the membranes can significantly shorten the service life of the fuel cells. Another problem is primarily associated with the supply of fuel and oxygen, typically hydrogen and atmospheric oxygen, to the fuel cells during start-up. After the fuel cell system has been idle for a longer period of time, the hydrogen has often diffused out of the anode chamber of the fuel cell and air or oxygen has penetrated there. If the fuel cell is now started, a hydrogen/oxygen front runs over the catalyst in the anode chamber. This leads to increased oxidation of the same, which shortens the service life of the fuel cell in the long term. In the application of fuel cell systems in vehicles described above, however, it is the case that a start takes place relatively frequently. Very often this takes place after a lengthy downtime, for example after the vehicle has been parked overnight. In this situation, this undesirable type of starting the fuel cell, which is also referred to as an air/air start, occurs often. Numerous measures therefore try to counteract this problem, for example by adding hydrogen from time to time or by carrying nitrogen in compressed gas storage tanks in order to flush the system with nitrogen before it is started. All of this may work in test mode. All of these technologies are too complex, too expensive or associated with too many emissions for regular use in a large vehicle fleet.

An exemplary fuel cell system can be found in DE 10 2009 043 569 A1. This system provides on the one hand a system bypass for connecting the pressure side to the outlet air side on the one hand and on the other hand a connection between the anode side and the cathode side via a blow-off line with a so-called blow-off or purge valve. In addition, a gas/gas humidifier that is customary in such fuel cell systems is indicated, which is used to humidify the supply air flow to the cathode chamber of the fuel cell through its moist outlet air flow. In practice, however, these components are relatively large, complex and expensive.

The object of the present invention is now to specify an improved fuel cell system which, due to its structure, can dispense with a gas/gas humidifier and avoid numerous operating situations that impair the safety and service life of the fuel cell.

This object is achieved according to the invention by a fuel cell system with the features in claim 1. Advantageous configurations and further developments of the fuel cell system result from the dependent claims. Claim 12 also specifies a particularly preferred method for operating such a fuel cell system.

The fuel cell system according to the invention comprises at least one fuel cell stack, which in turn comprises an anode chamber and a cathode chamber. The fuel cell stack can preferably be constructed as a PEM fuel cell stack from a plurality of individual cells. It is also referred to overall as a fuel cell or fuel cell stack. The cathode chamber of this fuel cell is supplied with air via at least one air conveying device via a feed air line. The air then escapes from the cathode chamber, for example into the environment, via an outlet air line. In addition, at least one fuel supply device is provided for supplying the anode chamber with fuel. This can be, for example, a compressed gas storage device for hydrogen as a fuel. The structure of the fuel cell system will also typically have a so-called anode circuit, which serves to recirculate unused fuel, in particular hydrogen. This is recirculated around the anode chamber, i.e, fed back from the outlet of the anode chamber to the inlet. In most operating situations, it is mixed with fresh hydrogen and returned to the anode chamber. The fuel cell system also comprises a cathode bypass, i.e., for example, a fine that is formed parallel to the cathode.

According to the invention, this cathode bypass branches off upstream of or in the region of a valve device in the feed air line and opens into the outlet air line downstream of or in the region of a further valve device. All of this can be built around the cathode chamber or the fuel cell on the system side. However, it can also be fully or partially integrated into the fuel cell and/or its housing. The cathode chamber can thus be shut off and the air actually flowing towards and through the cathode chamber can be guided through the cathode bypass. Mixed forms of these two operating states are conceivable, possible and often useful. In the fuel cell system according to the invention, a gas jet pump driven by the air flowing around the cathode chamber is arranged in the cathode bypass. In the event that air is guided around the cathode chamber, the gas jet pump is therefore driven by this air as a driving jet. On the suction side, the gas jet pump is connected in a switchable manner both to the anode chamber and to the cathode chamber. In this way, gases and possibly liquid can be sucked out of the volume of the anode chamber or the anode circuit as well as from the volume of the cathode chamber. In the ideal case, the suction takes place relatively evenly in order to avoid excessive pressure differences between the cathode chamber and the anode chamber and thus to protect the membranes. The mere possibility of being able to suck off gas both from the anode chamber and from the cathode chamber, either selectively or together, via the cathode bypass according to the invention with the gas jet pump creates a plurality of new application possibilities.

In the method according to the invention, which is claimed in claim 12, this is described. If necessary, gases can be extracted from the anode chamber and/or the cathode chamber. This will be discussed in more detail later and the possibilities and advantages that can be achieved with it will be explained in detail.

With regard to the constructive structure of the fuel cell system, according to a very advantageous configuration of the idea, it can also be provided that in the anode circuit a fan is driven as a recirculation conveying device by an outlet air turbine in the outlet air line. Energy in the outlet air can thus be used in the fuel cell system according to the invention. In contrast to many conventional fuel cell systems, this energy should not be used in an electric turbocharger to support the compression of the supply air, but to recirculate the anode exhaust gases in the anode circuit. This enables efficient exhaust gas recirculation, for example, despite the use of the energy contained in the outlet air, which will be explained in more detail later.

The valve devices in the feed air line and/or outlet air line, in the region of which the cathode bypass branches off, can each be formed as 3/2-way valves according to a very advantageous embodiment. In principle, a different structure or just a 3/2-way valve and a shut-off valve in the other line would also be conceivable. In principle, it should only be ensured that the volume contained in the cathode chamber can be shut off while the air flows through the cathode bypass with the gas jet pump.

The air conveying device used in the fuel cell system according to the invention can preferably be formed in two stages. In particular with such a two-stage air conveying device, which is provided in the fuel cell system according to the invention according to a very advantageous development of the latter, a sufficiently high pressure can be achieved in order to be able to operate the gas jet pump in the cathode bypass very efficiently. In principle, any type of two-stage compression is conceivable, for example using two electrically driven flow compressors connected in series.

According to an extremely favorable further development of this idea, however, it can be provided that the two-stage air conveying device is formed in the form of a free-running turbocharger, which is connected on the turbine side to the pressure side of a first compressor wheel of an air compressor, and which is connected on the compressor side to the pressure side of a second compressor wheel of the same air compressor. The air compressor in the fuel cell system according to the invention according to this configuration thus has two compressor wheels which, according to an extraordinarily favorable further development of this configuration, are formed symmetrical and arranged on a shaft with a common electric motor. This enables a structure in which a very good compensation of axial forces is possible due to the symmetrical arrangement of the compressor wheels and the electric drive arranged between them. This increases efficiency because friction can be minimized. In addition, simpler and smaller thrust bearings are possible, which is another advantage. With this structure, the compressor side and the turbine side of a free-running turbocharger can now be flown to. The compressor with the two symmetrical compressor wheels thus supplies the compressor side of the freewheel in order to realize register charging. At the same time, the turbine of the freewheel is flown via the other compressor wheel, so that this second compressor wheel is responsible for driving the freewheel.

This is extraordinarily simple and efficient and allows a number of other advantages in addition to the possibility of generating a correspondingly high pressure, which is a decisive advantage for the operation of the gas jet pump in the cathode bypass. For example, if the electrically driven flow compressor on the first compressor wheel provides a pressure level of 1.5 to 2.5 bar, this pressure can be increased further via the freewheel, for example to up to 4.5 bar to supply the fuel cell. The structure also makes it possible to supply the fuel cell system with very humid gases, since the structure of the freewheel can be designed in such a way that, in the event that it freezes, it still allows sufficient air from the first electrically driven compressor wheel to pass through, so that the fuel cell system can also be started in adverse weather conditions. This enables, for example, the recirculation of moist exhaust gas, which will be discussed in more detail later.

According to a further very favorable configuration of the fuel cell system according to the invention, it can also be provided that a water separator is arranged in the outlet air line in the flow direction of the outlet air after the outlet of the cathode bypass into the outlet air line. In this way, the water that accumulates in regular operation in the region of the cathode chamber can be separated and collected in this water separator. Since most of the product water occurs in the region of the cathode chamber, this is the primary amount of water occurring in the fuel cell system. By connecting the anode circuit or the anode chamber, preferably via the anode circuit and its blow-off or purge line or purge/drain line, the water from this region of the fuel cell system reaches the cathode bypass and from here goes into the water separator in the outlet air line via the gas jet pump. It therefore collects all the water in the fuel cell system. In the variant in which a turbine for driving a blower is arranged in the outlet air line as a recirculation conveying device, it can also be provided that the water separator is located upstream of this outlet air turbine in the direction of flow. In this way, it can protect the outlet air turbine from droplets potentially contained in the outlet air, which could possibly damage the high-speed turbine.

An extraordinarily favorable embodiment of the fuel cell system according to the invention can also provide that an exhaust gas recirculation line connects the outlet air line after the mouth of the cathode bypass and, if an outlet air turbine is provided, also after this one with a register line between the two stages of compression in a switchable manner. This structure allows exhaust gas recirculation in order to return outlet air and in particular the moisture contained in the outlet air to the cathode chamber. The second compressor stage, in particular the free-running turbocharger, can thus be used for the recirculation of outlet air, which is now completely or preferably partially recirculated and circulated through the second compressor stage, in particular the freewheel. As a result, the moisture that is entrained in the cathode outlet air as a product of the reaction in the fuel cell and has not already been separated out in the form of liquid water, if a water separator is provided, can be returned. In this way, on the one hand, humidification of the supply air to the cathode chamber can be achieved and, on the other hand, the oxygen content in the supply air to the cathode chamber can be reduced, in particular adjusted. As a result, the oxygen content in the cathode can be reduced, for example, when there is little electrical load on the fuel cell. This prevents cell voltages that are too high and thus damage to the individual cells of the fuel cell. This procedure is also referred to as oxygen depletion or air starvation. It allows the voltage of an individual cell to be kept below 0.9 V, for example, and thus protects the cells on the one hand and ultimately limits the overall voltage of a fuel cell stack on the other hand. In the case of large fuel cell stacks in particular, such as those used in commercial vehicles, this enables the maximum voltage of the fuel cell stack to reliably fall below a specified limit, which in turn means that with a corresponding classification in a specified high-voltage class, the voltage limit specified for this HV class can be reliably maintained even with a larger number of individual cells. Within the HV class, the number of individual cells and thus ultimately the performance of the fuel cell can be increased. If the recirculation of the outlet air is not sufficient to reduce the oxygen content sufficiently so that a correspondingly low voltage of the individual cells can be guaranteed, part of the air could also be routed through the cathode bypass and the gas jet pump in this situation with the structure of the fuel cell system according to the invention. When the connection to the cathode is open, oxygen would then be actively sucked out of the cathode chamber, which again supports the limitation of the individual cell voltages in order to guarantee compliance with the limit values for the individual voltages and the limit value for the entire fuel cell stack even more reliably.

According to an extraordinarily advantageous embodiment, the fuel cell system according to the invention can have a liquid water system. The at least one water separator is connected to a water tank for this purpose or forms it directly. The water tank itself is then connected to a pressurized water distributor, for example a common rail, via a water pump. Branch lines then branch off from this pressurized water distributor to points of consumption for the liquid water. The liquid water can advantageously be heated, for example via waste heat from the fuel cell system or via electrical heating. Such components are also used in the field of internal combustion engines, so that they are easily and cost-effectively available on the market.

According to another very favorable configuration of this idea, it can be provided that the consumption points comprise hydrodynamic bearings of the free-running turbocharger and/or at least one humidifier in the supply air. This humidifier can be formed in particular in the form of a one- or two-component nozzle. The liquid water system thus allows the freewheel, if it is present, to be stored hydrodynamically.

This leads to an extremely simple and efficient mounting of this component, which ensures operation of the freewheel with very little friction. In contrast to an electrically driven turbocharger, it is completely uncritical if moisture or water escapes from the region of the hydrodynamic bearing, since this only ends up in the outlet air or in the air supply to the fuel cell. In both airflows, additional water or additional moisture does not play a role or does not represent a disadvantage. In the supply air, this humidity would actually be more of an advantage.

The humidifiers can now be formed particularly easily in the form of a one- or two-component nozzle. These humidifiers can be arranged in the supply air before and/or after the second compressor stage. As a result, the compression by the injected water, for example finely atomized water from a two-component nozzle, is correspondingly moist and atomized in the two-component nozzle by the air flowing around the actual water nozzle. This atomized water helps cool the air that heats up during compression and is vaporized in the air so that it is ideally humidified. Humidification can take place independently of the operation of the fuel cell, particularly when the corresponding humidifier is electrically driven, which is another very important advantage over a much more complex, larger and more expensive gas/gas humidifier, which can be omitted with this structure.

The fuel cell system in one or the other configuration according to the invention shows its particular advantages when it comes to achieving corresponding advantages via the operation of the gas jet pump in the cathode bypass and in particular to avoiding disadvantageous operating states for the service life of the fuel cell. The method according to the invention therefore provides that, if required, the cathode chamber and/or the anode chamber is connected to the gas jet pump and gases are thus sucked out of these regions.

As already mentioned, this can be used, for example, to support the air starvation, which can be initiated primarily via the exhaust gas or outlet air recirculation, if necessary, especially in system states in which there is not enough oxygen-depleted outlet air available for recirculation.

Another aspect can be used, for example, to increase the safety of the fuel cell system when used in a vehicle. If the vehicle is involved in an accident, there is always a risk that if the anode chamber is still filled with hydrogen and the cathode chamber is still filled with oxygen, a correspondingly high voltage will be applied to the fuel cell, which can be problematic for both the occupants and any rescue workers. However, typically the compressor and turbocharger, if present, are still active at the time of the accident. If the vehicle's crash sensors detect an accident, the hydrogen supply can be interrupted and the flow through the cathode chamber can be blocked via the valves. When the compressor and/or turbocharger, which runs very quickly during operation, is coasting down, there is still a sufficient volume flow so that the cathode and the anode can be sucked off via the gas jet pump in the cathode bypass in order to reduce the voltage potential of the fuel cell as quickly as possible and to minimize the risk to occupants and rescue workers.

Another very favorable possibility of using the fuel cell system according to the invention is when preparing for a later freezing start. The fact that the anode and the cathode can be sucked off via the gas jet pump in the cathode bypass means that the pressure in the fuel cell stack can be lowered, preferably evenly, both in the anode chamber and in the cathode chamber. A pressure reduction to, for example, up to 100 mbar is possible. In practice, this means that water, which is in liquid form in the fuel cell and is not desirable there due to the risk of freezing later when the temperatures fall below the freezing point, is evaporated already at very low temperatures of 20 to 40°, in particular 25 to 30° C. This allows the fuel cell stack to be dried, and due to the relatively low temperature, the drying of the membranes can be achieved in a relatively gentle manner. Drying at correspondingly higher temperatures, in particular at the operating temperatures of the fuel cell stack of approx. 80° C. would dry out the membranes to a great extent and thus put them under extreme stress.

In the preferred structure according to the invention with the liquid water system and the humidifiers, humidification of the membranes is also possible when the system is at a standstill. On the cathode side, liquid water that is available in the fuel cell system is metered in via the humidifier, which can be formed, for example, in the form of an electrically driven injector with a single-fluid nozzle, and brought to the membranes by an inflow of supply air into the cathode chamber, which can thereby be (re) humidified if necessary.

A further advantage in terms of process engineering is that the harmful air/air starts of the fuel cell mentioned at the outset can be prevented. A possible solution with the fuel cell system according to the invention provides that a vacuum is drawn at least for the cathode chamber and possibly also completely or partially on the anode, so that the pressure difference typically remains less than 500 mbar. As a result, oxygen is sucked out in the region of the cathode. This process can be repeated from time to time, in a similar way to a previously customary and now no longer necessary replenishment of hydrogen, for example according to a predetermined time grid, for example every 10 hours, or at least again when it has been recognized that the start of the fuel cell system is now imminent. If the temperatures are above the freezing point, this would dry out the membranes very much in the long run, since the water contained therein evaporates due to the negative pressure.

For this reason, the above-mentioned humidification of the membranes, preferably at temperatures above the freezing point, can be carried out from time to time, which has an advantageous effect on the overall service life of the fuel cell system or its fuel cell.

In the configuration of the fuel cell system with the exhaust gas recirculation line, which opens out between the two stages of the compressor, circulation around the cathode is also possible. This makes it possible to deplete the air in this circuit to 0% oxygen. To do this, hydrogen can be introduced into the circuit around the cathode until the oxygen is completely consumed. This metering in of hydrogen can take place, for example, via the anode chamber, into which a certain amount of hydrogen is metered and then sucked out of it again by the gas jet pump in the cathode bypass. The hydrogen is then mixed with the oxygen in the air and can, for example, react on the cathode catalyst until the oxygen is completely consumed. As an alternative to this, it would also be conceivable to provide an additional catalytic converter, in particular downstream of the gas jet pump in the direction of flow. If a negative pressure is then generated in the fuel cell, this oxygen-depleted air, which essentially consists of nitrogen, can flow into the region of the anode chamber by opening the purge valve. In this phase, the cathode chamber can be flowed through parallel to the cathode bypass and is then also filled with nitrogen. This enables an extraordinarily gentle start, in which both the anode chamber and the cathode chamber are filled with nitrogen, without the nitrogen having to be laboriously carried along and/or (intermediately) stored. Rather, the special structure of the fuel cell system according to the invention makes it possible to generate this nitrogen in the fuel cell system when required.

Another aspect of fuel cell systems is the poisoning of the anode-side catalytic converter with carbon monoxide, which occurs during regular operation and increases with the operating time. Up to now, this has required an occasional air/air start in order to oxidize the carbon monoxide to carbon dioxide due to the oxygen introduced and to remove it from the system. The reduced service life of the fuel cell must be accepted. As already mentioned several times above, however, such an air/air start should be avoided as far as possible because of the risk of reducing the service life of the fuel cell. The fuel cell system constructed according to the invention now enables an extremely gentle procedure here. The fuel cell itself and thus also its anode chamber, which is susceptible to the poisoning of the catalyst, is evacuated, as already described above, by using the cathode bypass with the gas jet pump. By opening the purge valve, oxygen-containing air now enters the anode more or less backwards through the gas jet pump. This can now remain there passively or, preferably, if a recirculation fan is present, be circulated by it. As a result, the catalytic converter can be refreshed and freed of CO contamination without an air/air start being necessary. Before the next start, oxygen and carbon dioxide are sucked out of the anode chamber or the anode circuit.

A simple modification in the structure of the fuel cell system results in numerous advantages in terms of process management, so that an extraordinarily efficient and durable fuel cell system can be made available, which enables the fuel cell to be operated very gently, Further advantageous embodiments of the fuel cell system according to the invention and its methods of operation result from the exemplary embodiment, which is represented in more detail hereinafter with reference to the FIGURE.

The only attached FIGURE shows a possible embodiment of a fuel cell system according to the invention.

Figure 1:
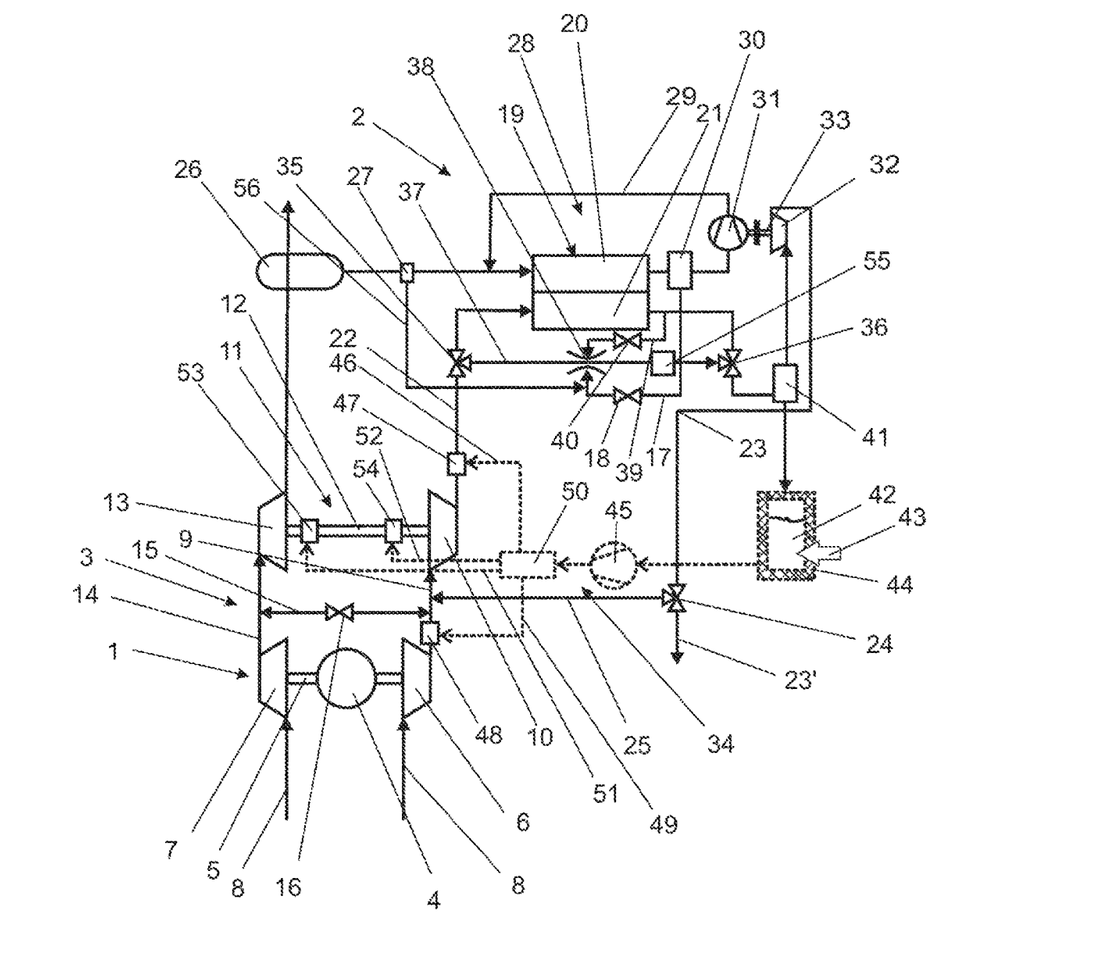

In the representation of FIG. 1, an air compressor 1 for a fuel cell system 2 is shown. The air compressor 1 consists essentially of an electric drive motor 4, which is arranged on a common shaft 5 with two compressor wheels 6, 7. The compressor wheels 6, 7 are driven by the electric drive motor 4 arranged centrally between them on the shaft 5 and are designed essentially symmetrically. As a result, forces acting on the common shaft 5 in the axial direction are minimized. On the one hand, this helps to reduce friction losses and, on the other hand, allows axial bearings to be designed in a simple and efficient manner. Air is sucked in by the compressor wheels 6, 7 via two separate or optionally a common intake path 8. The air filters that are typically present are not represented here.

From the compressor wheel 6, the compressed air reaches a compressor side 10 of a free-running turbocharger 11, which is also referred to as a freewheel 11, via a register line 9. In this freewheel 11, a common shaft 12 connects the compressor side 10 to a turbine side 13, which is connected to the pressure side of the compressor wheel 7 of the air compressor 1 and is accordingly driven by this compressor wheel 7 via the air flow. Downstream of the turbine side 13 or its turbine, the expanded air, which had previously reached the turbine side 13 of the freewheel 11 via a turbine line 14 from the compressor wheel 7, flows out again. In the representation of the FIGURE, the turbine-side derivation leads to the environment via the compressed gas reservoir 26 for hydrogen. In practice, it is typically the case that it cools down very strongly when hydrogen is removed, so that it can be ideally kept warm with the waste heat in the outlet air of the turbine side 13. The air can also flush out any leaks, for example by flowing through a housing arranged around the compressed gas reservoir 26 or the like. Another use of the outlet air coming from the turbine side would also be conceivable, for example heating other heat-requiring components located in the fuel cell system 2, for example heating the water tank 42, which will be described in more detail later.

From the compressor side 10 of the freewheel 11, the supply air, which is now even more compressed, reaches the fuel cell system 2. This structure makes it possible for a freewheel 11 to be used in order to generate the pressure required for the fuel cell system 2 on the compressor side 10 of the freewheel 11 based on the pressure that the compressor wheel 6 generates as the first compressor stage. It is therefore a kind of register charging. The freewheel 11 and the air compressor 1 together form a two-stage air conveying device 3.

In addition, a bypass line 15 with a valve 16 is provided, which makes t possible to conduct part of the air that has been compressed via the compressor wheel 7 of the air compressor 1 from the turbine line 14 into the register line 9. As a result, a higher volume flow of air to the fuel cell system 2 can be implemented, for example, when the valve 16 is fully or partially open. At the same time, the air flow through the turbine side 13 of the freewheel 11 is correspondingly reduced, so that although there is a higher volume flow, the pressure in the fuel cell system 2 is lower. With increasing closing of the valve 16 in the bypass line 15, the power on the turbine side 13 and thus also the compressor power on the compressor side 10 of the freewheel 11 increases accordingly, while at the same time the volume flow decreases. This allows a higher pressure to be achieved with a lower volume flow. In addition, the direction of flow can also be such that more air flows to the turbine side 13 of the freewheel 11 via the bypass line. In the extreme case, all of the air in the air compressor 1 can be used to drive the freewheel 11. The air supply can therefore be controlled via the valve 16 in the bypass line 15. Even if the bypass line 15 with the valve 16 offers particular advantages, it is to be understood here as purely optional and can in principle also be omitted.

The fuel cell system 2 comprises a fuel cell 19, which is typically a stack of individual cells. In this fuel cell stack or stack 19, an anode chamber 20 and a cathode chamber 21 are indicated by way of example. The cathode chamber 21 is now supplied with air via the air compressor 1 and the freewheel 11 via a feed air line 22. Outlet air arrives at a valve device denoted by 24 via an outlet air line 23, wherein this valve device 24 can also be denoted as an exhaust gas recirculation valve 24, Optionally, the outlet air from the outlet air line 23 can be completely or partially returned to the register line 9 via an outlet air return line 25 via this valve device 24, or to the environment via the section of the outlet air line 23 denoted by 23'. In contrast to many conventional systems, the outlet air no longer flows through an outlet air turbine in section 23'.

The anode chamber 20 is supplied with hydrogen from a compressed gas storage device 26. As an alternative to such a compressed gas storage device 26, other storage options for the hydrogen would also be conceivable, for example cryogenic storage devices or hydride storage devices. This hydrogen reaches the anode chamber 20 via a pressure control and metering device 27. Exhaust gas from the outlet of the anode chamber 20 then returns to its inlet via an anode circuit 28 with a recirculation line denoted by 29, in which a water separator 30 can be arranged, and flows back into the anode chamber 20 mixed with fresh hydrogen in most operating states. A recirculation fan 31 can be arranged in the recirculation line 29 in a manner known per se as an alternative or in addition to a gas jet pump—not represented. In the water separator 30 or alternatively in another region of the recirculation line 29 there is arranged a blow-off line 17 with a so-called blow-off valve or purge valve 18 or purge/darin valve, via which, for example, depending on the time, depending on the hydrogen concentration in the recirculation line 29 or depending on other parameters, gas is discharged from the recirculation line 29, optionally together with water from the water separator 30.

In this configuration of the fuel cell system 2, it is now possible to completely or partially recirculate outlet air via the exhaust gas recirculation line 25 with the appropriate position of the valve device 24, so that the humidification of the air supply in the feed air line 22 to the cathode side 21 of the fuel cell 19 is supported. As an alternative or in particular in addition to the use of a liquid water system 34, as indicated by dashed lines in the representation of the FIGURE and explained in more detail later, this can contribute to the fact that a conventional gas/gas humidifier can be dispensed with. Admittedly, there is now a risk here of moisture getting into the region of the freewheel 11. If the system is at a standstill at temperatures below the freezing point, this can lead to the freewheel 11 freezing up. In contrast to the freezing of the compressor wheels 6, 7 in the air compressor 1, this is relatively uncritical, since for the start of the fuel cell system 2 the air which is conveyed via the compressor wheel 6 and, if applicable, via the compressor wheel 7 when the bypass valve 16 is open, and blown through the compressor side 10 of the freewheel 11 into the feed air line 22, is by far sufficient. It is therefore sufficient if the freewheel 11 resumes its operation when it has thawed sufficiently. The structure with the combination of air compressor 1 and freewheel 11 thus enables not only optimal operation with a high controllability of pressure and volume flow of the supplied air, but also—especially in combination with the liquid system 34—the omission of a conventional gas/gas humidifier, since the exhaust gas recirculation is possible without the risk of freezing of the entire air conveyor 1 in the case of temperatures below the freezing point.

In contrast to conventional electric turbochargers, in which the pressure energy from the fuel cell system 2 is expanded and is also used to support the drive of the air compressor 1 this pressure cannot be used for the air conveying device 3 here. Instead of an electric drive for the recirculation fan 31, as is typically provided, the situation here is that the outlet air flows out of the cathode chamber 21 of the fuel cell 19 via an outlet air turbine 32 which is arranged in the outlet air line 23 and is coupled to the recirculation fan 31 in a power-transmitting manner, which is indicated here in the form of a common shaft 33. This makes it possible to use the energy contained in the outlet air from the cathode chamber 21 of the fuel cell 19 to drive the recirculation fan 31 in order to recover this energy again and thus make the overall system more energy-efficient. It is particularly favorable if the coupling between the outlet air turbine 32 and the recirculation fan 31 takes place magnetically. As a result, the two volumes, which carry hydrogen or hydrogen-containing gas on the one hand and air on the other hand, can easily be hermetically sealed from one another. This is indicated in the FIGURE by the two lines in the region of the shaft 33.

It is now decisive for the structure of the fuel cell system 2 described here that both in the feed air line 22 and in the outlet air line 23, and here in each case relatively close to the cathode chamber 21, a valve device 35 is arranged in the direction of flow in front of the cathode chamber 21 and a valve device 36 is arranged in the direction of flow after the cathode chamber 21. These valve devices 35, 36 can preferably, and this is how it is shown here, be designed as 3/2-way valves. Essentially, however, they could also be realized by independent valve devices, which are arranged both in the feed air line 22 and in the outlet air line 23 and which would also be arranged in a cathode bypass 37. Essentially, the point is that the cathode bypass 37 can be switched via the valve devices 35, 36, specifically with the cathode chamber 21 closed off or the volume comprising the cathode chamber 21 closed off. Unlike a pure system bypass, the cathode bypass 37 is provided with a gas jet pump 38, which can be formed, for example, in the manner of a Venturi tube. However, any other type of gas jet pump or ejector or jet pump is also conceivable, as long as gases can be sucked in from the air flowing around the cathode chamber 21 by negative pressure effects and/or momentum exchange. For this purpose, on the suction side, the gas jet pump 38 is connected to the blow-off line 17, which can be switched via the purge valve 18 in order to connect the blow-off line 17 to the gas jet pump 38. In this way, liquid and in particular gas can be sucked out of the anode circuit 28 and thus also out of the anode chamber 20. Since the anode circuit 28 is otherwise sealed and forms a closed volume when the hydrogen supply is shut off, this allows a negative pressure to be achieved in the anode circuit 28, which is very favorable for the reasons that will be explained later.

The gas jet pump 38 is also connected on the suction side to the cathode chamber 21 or to the volume lying between the valve devices 35 and 36 and comprising the cathode chamber 21 via a cathode branch line 39 and a cathode suction valve 40 arranged therein. The cathode branch line 39 can be arranged both before and after the cathode chamber 21, i.e. with an opening into the feed air line 22 or the outlet air line 23. In principle, a direct connection to the fuel cell stack 19 would also be conceivable, but this is technically far more complex than branching off from the corresponding line 22, 23. Here, too, gas can now be drawn out of the cathode chamber 21 when the cathode bypass 37 is flowed through by the gas jet pump 38 with the cathode exhaust valve 40 open, which means that when the valve devices 35 and 36 are closed, a negative pressure can also be generated in the cathode of the fuel cell 19. This will also be explained in more detail later with regard to the particularly advantageous use.

The liquid water system 34 already mentioned is represented in dashed lines in the FIGURE, It can preferably be filled with water, which is recovered from the fuel cell system 2. The fuel cell system 2 typically has the water separator 30 in the recirculation line 29 and a further water separator 41 in the region of the outlet air line 23, and here if possible upstream of the outlet air turbine 32. In the exemplary embodiment of the fuel cell system 2 represented here, the water from the water separator 30 also reaches the water separator 41 via the gas jet pump 38 and the cathode bypass 37. Alternatively, a parallel line from the water separator 30, for example into the water separator 41 or directly into a water tank 42 of the liquid water system 34, would also be conceivable, in which all the water from all the water separators 30, 41 of the fuel cell system 2 would then be collected. As indicated by the arrow denoted by 43, this water tank 42 is now supplied with heat. In principle, this can involve electrical heating, as is generally known and customary for water tanks of this type in the region of vehicles with internal combustion engines. As an alternative or in addition to this, waste heat from the fuel cell system 2 can also be used, for example waste heat from the fuel cell 19 itself, or waste heat in the outlet air, in particular in the outlet air flowing out of the turbine side 13 of the freewheel 11, which, however, could alternatively also be used to heat the compressed gas accumulator 26.

The water stored in the water tank 42 ideally has a temperature of approx. 80° C., the water tank 42 therefore has thermal insulation 44 in order to prevent the water tank 42 from cooling down quickly and unnecessarily. The water from the water tank 42 is then fed via a water pump 45 into a pressurized water distributor 50, for example in the form of a so-called common rail. Individual branch lines then branch off from this pressurized water distributor 50 which is under pressure. A first branch line 46 leads to a first humidifier 47. This is formed as a simple humidifier 47 that atomizes the water ith a single-component nozzle or a two-component nozzle. It can, for example, be operated with electrical energy and thus independently of the operation of the fuel cell 19 and controlled with regard to humidification. Together with the exhaust gas recirculation during operation, a complex conventional gas/gas humidifier can now be dispensed with in any case. Another humidifier 48 is optionally provided, which has a comparable structure. It is located in the register line 9 and is supplied with the pressurized water from the pressure water distributor 50 via a second branch line 49. As already mentioned, this previous structure of the liquid water system 34 is also used in internal combustion engine drives, in particular internal combustion engines with gasoline injection. The components such as the water pump 45, the heatable water tank 42 and the humidifier 47, 48 are therefore available on the market as sufficiently tried and tested parts in large numbers and are therefore available at low cost, Two further branch lines 51 and 52 supply two hydrodynamic bearings 53, 54 of the free-running turbocharger 11 with water, so that it is water-bearing. In the fuel cell system 2 there will typically be sufficient water to accomplish both the humidification of the supply air stream and the mounting of the free-running turbocharger 11 so that the water can be supplied without an external supply of water.

Such a fuel cell system 2 with the cathode bypass 37 and the gas jet pump 38 arranged therein, which is driven by the air flowing parallel to the cathode chamber 21 and which can be switched to suction both the cathode chamber 21 and the anode chamber 20, now enables numerous advantageous options, via which some problems can be solved, which could not be solved or could not be solved in a comparable manner in previous fuel cell systems and have adversely affected the safety and in particular the longevity of the individual cells in the fuel cell stack 19.

As already mentioned, such a fuel cell system now allows special advantages in operational management. With an appropriately adjusted exhaust gas recirculation valve 24, its compressor side 10 can be used during operation of the freewheel 11 in order to realize a recirculation of outlet air around the cathode chamber 21. At the same time, part of this recirculated air can flow through the cathode bypass 37 and thus through the gas jet pump 38. This makes it possible, for example, to suck off gases from the anode chamber 20 and/or the cathode chamber 21 if the purge valve 18 or the cathode suction valve 40 is opened accordingly. Various applications are conceivable. For example, in the event of an accident, when crash sensors of a vehicle (not represented here) that preferably has the fuel cell system 2 detect this accident, the hydrogen supply can be stopped. With the remaining volume flow, when the air compressor 1 and the freewheel 11 coast down, gas can then be sucked out of the blocked cathode chamber 21 and the anode circuit 28 and thus the anode chamber 20. As a result, the (no-load) voltage of the fuel cell 19 can be reduced very quickly when the load is dropped and the current of the fuel cell 19 is reduced to zero, in order to prevent the occupants of the vehicle and rescue workers from being endangered. The same also applies to the reaction to the actuation of an emergency off switch or an emergency that is detected in the fuel cell system 2 itself. This can also be applied analogously to stationary fuel cell systems.

Furthermore, the oxygen content in the fuel cell 19 can be reduced in order to limit the cell voltage, for which purpose a corresponding amount of oxygen-depleted outlet air is recirculated via the exhaust gas recirculation valve 24 and the exhaust gas recirculation line 25 and also supports the humidification of the supply air. If this is not sufficient, oxygen can also be actively sucked out of the cathode chamber 21 with the cathode suction valve 40 open, if required, by routing part of the supply air via the cathode bypass 37 and the gas jet pump 38, in order to restrict the voltage in the individual cells or the voltage of the entire fuel cell stack 19 further and in a manner which is more reliably controllable.

Two very crucial points for the operation of the fuel cell system 2 relate to a preparation for a freeze start, a so-called FSU (Freeze Start Up) preparation. The fact that it is possible to lower the pressure in the anode chamber 20 and in the cathode chamber 21, for example down to 100 mbar, makes it possible to evaporate water present both in the anode chamber 20 and in the cathode chamber 21 and to actively suck it off via the gas jet pump 38. This can take place, for example, in a temperature window of 25 to 35° C. of the fuel cell 19. Unlike at higher temperatures, the membranes are largely prevented from drying out, so that the fuel cell 19 can be dried very gently. If the temperatures later fall below freezing point, the fuel cell can be prevented from freezing beyond a desired or tolerable level. If the temperatures rise above freezing again, active humidification can be carried out even without the fuel cell 19 being actively started, since liquid water is a table via the liquid water system 34 and, for example, can be easily and efficiently introduced into the supply air via the humidifier 47, which can in particular be formed an electrically operated humidifier with a single-component nozzle. As already mentioned, this can be circulated via the exhaust gas recirculation valve 24 in order to keep the membranes sufficiently moist on the one hand and to be prepared for a freezing start at any time on the other hand.

A strategy that has been customary up to now for preparing for the freezing start is to achieve as long a time as possible in which an air/hydrogen front is prevented when the fuel cell system is started in the anode chamber. This always occurs when the hydrogen has diffused out of the anode chamber 20 and air has penetrated. If fresh hydrogen is then replenished, this dreaded front occurs, which damages the cathode accordingly and has an extraordinarily disadvantageous and strong influence on the service life of the fuel cell 19. The fuel cell system 2 in the embodiment variant represented here now has several options for preventing such an air/air start.

The first possibility is that the cathode chamber 21 can be appropriately evacuated. If there is no oxygen in it, the front cannot develop its damaging effect even if oxygen is present on the anode side and is displaced by hydrogen flowing in during the start. This simple possibility can provide, for example, for the cathode to be permanently kept free of oxygen, which, given the tightness that usually occurs in the system, requires the cathode chamber 21 to be evacuated again, for example every 10 hours or the like. Since such a recurring evacuation is relatively risky for the membranes, as they can dry out, this procedure can be accompanied in particular by the humidification of the membranes described above when the temperatures are above freezing point and a safe and reliable start is possible even with a certain residual moisture in the fuel cell 19.

A second way of avoiding an air/air start of the fuel cell 19 is to suck out the air again that has also entered the anode chamber 20 while the fuel cell system 2 was at a standstill before starting the fuel cell 19 from the anode chamber 20, i.e. to evacuate it. For this purpose, air is conveyed and flows via the cathode bypass 37 and the gas jet pump 38. When the purge valve 18 is open, the air which has penetrated into the anode chamber 20 during the standstill can be sucked off. This makes it possible to at least significantly reduce the oxygen content in the volume of the anode chamber 20 and ultimately also of the anode circuit 28 before hydrogen is metered in when the fuel cell 19 is started. This also allows a gentle start to be implemented and the service life of the fuel cell 19 to be extended.

The third option uses the generation of nitrogen or oxygen-depleted air, in particular air with an oxygen content of 0%, in order to achieve a very gentle start. The circulation around the cathode chamber 21 is used for this purpose. Hydrogen metered into the anode circuit 28 or any residual hydrogen still present in it is sucked in via the gas jet pump 38 when the purge valve is open and thus enters the circuit together with the oxygen-containing air, which is maintained through operation of the air compressor 1, which flows against the turbine side 13 of the freewheel 11 and so that the compressor side 10 moves. The air then flows in a circle around the cathode chamber 21. It flows partly through the cathode chamber 21 and partly through the cathode bypass 37. It then flows via the outlet air line 23 and the exhaust gas recirculation valve 24 and the exhaust gas recirculation line 25 back into the register line 9 and from there driven through the compressor side 10 of the freewheel back to the valve device 35 in the feed air line 22. The mixing of hydrogen and air in this operation now leads to a reaction of the hydrogen and the oxygen, for example on the catalysts of the anode chamber 21 or in the region of a catalyst 55 specially provided for this purpose, which can be arranged for example in the cathode bypass 37 downstream of the gas jet pump 38, as represented here. In the case of the additional catalytic converter 55, the cathode chamber 21 does not have to be continuously flowed through in order to generate the nitrogen. This reduces the drying out of the membranes and protects them. If necessary, however, they could also be remoistened, as explained above.

The fourth way to avoid an air/air start is to some extent a combination of the second and third ways. In addition to the valve of the pressure control and metering device 27, which can now be switched in multiple stages in any case, a hydrogen metering line 56 is also required for this, via which hydrogen can be metered onto the cathode side. This hydrogen metering line 56 is connected to the gas jet pump 38 in the cathode bypass 37 in a manner similar to or as an alternative to the purge line 17, as can be seen in the representation of the FIGURE. It is thus possible to meter hydrogen via the hydrogen metering line 56 onto the cathode side of the fuel cell system 2 without this hydrogen having to flow through the anode chamber 20 beforehand. Oxygen in the air can thus be consumed by the catalytic converter 55 already mentioned above, which is connected downstream of the gas jet pump 38 in the circuit around the cathode chamber 21. It is then recirculated autonomously in this circuit with the aid of the valve devices 35, 36, the valve 16 and the exhaust gas recirculation valve 24 and through the operation of the freewheel 11. This continues until the oxygen content in the original air has been reduced to less than 1 percent by volume, in particular to approximately 0 percent by volume, with the aid of the catalyst and the hydrogen entering the circuit via the hydrogen metering line 56 in the region of the mixing point in the gas jet pump 38. The gas then recirculated is thus virtually free of oxygen and essentially consists of nitrogen.

This gas is heated at the same time by the recirculation via the freewheel 11, which promotes the catalytic reaction in the catalytic converter 55 in order to convert oxygen and hydrogen efficiently. A temperature range of approx. +60 to +80° C. is ideal for this. This allows the catalytic conversion to be controlled very well in order to avoid unwanted nitrogen oxides within the closed volume. These nitrogen oxides as a by-product are undesirable due to the emissions of the same that occur later, but would not further impair the careful use of the fuel cell 19 in terms of its service life.

After some time, all the oxygen will be used up if sufficient hydrogen is available or has been replenished accordingly. In the entire circuit there is now gas which has been depleted to 0% oxygen. This is essentially nitrogen, excluding carbon dioxide and some noble gases, which however do not adversely affect the process. Now that nitrogen is present in the circuit, the purge valve 18 can be opened, the freewheel 11 and thus ultimately the air compressor 1 can be switched off. The cathode exhaust valve 40 and/or the valve devices 35, 36 are opened. The nitrogen then flows back into the fuel cell 19 via the purge line and the cathode branch line and/or feed air line, so that it is filled with nitrogen. This enables an extraordinarily gentle start of the fuel cell during the next start-up process, without the damage mechanisms of the air/air start occurring.

A fifth possibility, in combination with the traditional way of keeping the hydrogen in the system, can also be used ideally in the structure of the fuel cell system according to the invention. Ideally, using a slight static overpressure compared to the air pressure in the surrounding atmosphere, the volumes of both the anode chamber 20 and the cathode chamber 21 are filled with hydrogen and kept under a slight overpressure in order to realize that the volume is completely inerted by a hydrogen concentration of almost 100 percent. Before the regular start, the residual hydrogen present in the cathode chamber 21 can now be removed again via the gas jet pump 38 and its operation by the supply air that has already been pumped but does not flow into the cathode chamber 21 in that the hydrogen is completely sucked out of the cathode chamber 21 before the cathode chamber 21 is then charged with oxygen or the air containing the oxygen by opening the valve device 35 in the direction of the cathode chamber 21 in order to be able to start the fuel cell system 2 or its fuel cell 19.

In order to still get oxygen into the anode chamber 20 from time to time in order to oxidize accumulated CO poisoning there, the fuel cell 19 can be evacuated again using the gas jet pump 38 in the cathode bypass 37. When the purge valve 18 is open, air or oxygen-containing gas can then get into the region of the anode chamber 20 when the air compressor is switched off. In principle, the passive oxidation of carbon monoxide to carbon dioxide is conceivable. It becomes more efficient if the recirculation conveyor device 31 is operated, for example by operating the air compressor 1 again after the air has flowed into the anode circuit 28 with the purge valve 18 initially closed, in order to, in the exemplary embodiment represented here, drive the recirculation conveyor device 31 in the form of the blower via the outlet air turbine 32. The refresh of the catalyst is then completed after a short time, for example on the order of less than a minute. The oxygen-containing gas can then be sucked out of the anode circuit again by opening the purge valve 18 again, and the system can be filled with nitrogen, for example, in the manner described above, in order to prepare it for the next start.

| List of reference numerals | |
| --- | --- |
| 1 | air compressor |
| 2 | fuel cell system |
| 3 | air conveying device |
| 4 | electric motor |
| 5 | shaft |
| 6 | second compressor wheel |
| 7 | first compressor wheel |
| 8 | intake path |
| 9 | register line |
| 10 | compressor side |
| 11 | free-running turbocharger |
| 12 | shaft |
| 13 | turbine side |
| 14 | turbine line |
| 15 | bypass line |
| 16 | valve |
| 17 | blow-off line |
| 18 | purge valve |
| 19 | fuel cell stack |
| 20 | anode chamber |
| 21 | cathode chamber |
| 22 | feed air line |
| 23 | exhaust line |
| 24 | exhaust gas recirculation valve |
| 25 | exhaust gas recirculation line |
| 26 | fuel supply device |
| 27 | pressure regulation and dosing device |
| 28 | anode circuit |
| 29 | recirculation line |
| 30 | water separator |
| 31 | recirculation conveyor |
| 32 | outlet turbine |
| 33 | shaft |
| 34 | liquid water system |
| 35 | valve assembly |
| 36 | valve assembly |
| 37 | cathode bypass |
| 38 | gas jet pump |
| 39 | cathode branch line |
| 40 | cathode exhaust valve |
| 41 | water separator |
| 42 | water tank |
| 43 | arrow |
| 44 | thermal insulation |
| 45 | water pump |
| 46 | branch line |
| 47 | humidifier |
| 48 | humidifier |
| 49 | branch line |
| 50 | pressurized water distributor |
| 51 | branch line |
| 52 | branch line |
| 53 | hydrodynamic bearing |
| 54 | hydrodynamic bearing |
| 55 | catalyst |
| 56 | hydrogen dosing line |

The invention claimed is:

1. A fuel cell system with at least one fuel cell stack, which comprises an anode chamber and a cathode chamber, with at least one air conveying device for the supply of the cathode chamber with air via a feed air line, with an outlet air line from the cathode chamber, with at least one fuel supply device for the supply of the anode chamber with fuel, with at least one anode circuit for the recirculation of unused fuel around the anode chamber, furthermore with a cathode bypass, characterized in that the cathode bypass branches off from the feed air line upstream of or in the region of a valve device in said feed air line, and opens into the outlet air line downstream of or in the region of a further valve device in said outlet air line, wherein a gas jet pump which can be driven by the air which flows around the cathode chamber is arranged in the cathode bypass, which gas jet pump is connected switchably on the suction side to the anode chamber and/or the cathode chamber.

2. The fuel cell system according to claim 1, wherein in the anode circuit, a fan is driven as a recirculation conveyor by an outlet air turbine in the outlet air line.

3. The fuel cell system according to claim 1, wherein at least one of the valve devices in the feed air line and/or the outlet air line is formed as a 3/2-way valve.

4. The fuel cell system according to claim 1, wherein the air conveying device is formed in two stages.

5. The fuel cell system according to claim 4, wherein the two-stage air conveying device is formed in the form of a free-running turbocharger, which is connected on the turbine side to the pressure side of a first compressor wheel of an air compressor, and which is connected on the compressor side to the pressure side of a second compressor wheel of the same air compressor.

6. The fuel cell system according to claim 5, wherein the first and the second compressor wheel are formed symmetrically and are arranged on a shaft with a common electric motor.

7. The fuel cell system according to claim 1, wherein a water separator is arranged in the flow direction of the outlet air after the mouth of the cathode bypass in the outlet air line, and in the flow direction of the outlet air in front of the outlet air turbine.

8. The fuel cell system according to claim 4, wherein an exhaust gas recirculation line switchably connects the outlet air line after the mouth of the cathode bypass, and in an embodiment according to claim 2, in particular after the outlet air turbine, to a register line between the two stages of compression.

9. The fuel cell system according to claim 7, wherein the at least one water separator is connected to or forms a water tank, wherein the water tank is connected to a pressurized water distributor via a water pump, from which branch lines branch off to consumption points.

10. The fuel cell system according to claim 9, wherein the consumption points comprise hydrodynamic bearings of the free-running turbocharger and/or at least one humidifier in the supply air, in particular in the form of a one or two substance nozzle.

11. The fuel cell system according to claim 10, wherein the at least one humidifier is arranged in the supply air before and/or after the second compressor stage.

12. A method for operating a fuel cell system according to claim 1, wherein if necessary, gases are sucked out of the cathode chamber and/or the anode circuit via the gas jet pump in the cathode bypass line.

13. The fuel cell system according to claim 2, wherein at least one of the valve devices in the feed air line and/or the outlet air line is formed as a 3/2-way valve.

14. The fuel cell system according to claim 2, wherein the air conveying device is formed in two stages.

15. The fuel cell system according to claim 3, wherein the air conveying device is formed in two stages.

16. The fuel cell system according to claim 5, wherein an exhaust gas recirculation line switchably connects the outlet air line after the mouth of the cathode bypass, and in an embodiment according to claim 2, in particular after the outlet air turbine, to a register line between the two stages of compression.

17. The fuel cell system according to claim 8, wherein the at least one water separator is connected to or forms a water tank, wherein the water tank is connected to a pressurized water distributor via a water pump, from which branch lines branch off to consumption points.

18. The fuel cell system according to claim 5, wherein the at least one humidifier is arranged in the supply air before and/or after the second compressor stage.

19. A method for operating a fuel cell system according to claim 2, wherein if necessary, gases are sucked out of the cathode chamber and/or the anode circuit via the gas jet pump in the cathode bypass line.

20. The fuel cell system according to claim 6, wherein an exhaust gas recirculation line switchably connects the outlet air line after the mouth of the cathode bypass, and in an embodiment according to claim 2, in particular after the outlet air turbine, to a register line between the two stages of compression.

* * * * *